United States Patent
Vo et al.

(10) Patent No.: US 11,907,226 B2
(45) Date of Patent: Feb. 20, 2024

(54) REFINING UNDERSTANDING OF NATURAL LANGUAGE DATABASE QUERIES

(71) Applicant: INTERNATIONAL BUSINESS MACHINES CORPORATION, Armonk, NY (US)

(72) Inventors: Ngoc Phuoc An Vo, Bronx, NY (US); Vadim Sheinin, Yorktown Heights, NY (US); Elahe Khorasani, Yorktown Heights, NY (US); Hangu Yeo, Westchester, NY (US)

(73) Assignee: International Business Machines Corporation, Armonk, NY (US)

( * ) Notice: Subject to any disclaimer, the term of this patent is extended or adjusted under 35 U.S.C. 154(b) by 100 days.

(21) Appl. No.: 17/655,564

(22) Filed: Mar. 21, 2022

(65) Prior Publication Data

US 2023/0297577 A1   Sep. 21, 2023

(51) Int. Cl.
*G06F 17/00* (2019.01)
*G06F 7/00* (2006.01)
(Continued)

(52) U.S. Cl.
CPC ...... *G06F 16/24564* (2019.01); *G06F 40/226* (2020.01); *G06F 40/279* (2020.01); *G06F 40/40* (2020.01); *G06F 40/30* (2020.01)

(58) Field of Classification Search
CPC .. G06F 16/24564; G06F 40/279; G06F 40/40; G06F 40/226; G06F 40/30
(Continued)

(56) References Cited

U.S. PATENT DOCUMENTS

| 11,734,328 B2 * | 8/2023 | Guggilla | G06F 16/93 |
| | | | 706/12 |
| 2010/0100546 A1 * | 4/2010 | Kohler | G06F 16/40 |
| | | | 707/739 |

(Continued)

OTHER PUBLICATIONS

Brunner et al., "ValueNet: A Natural Language-to-SQL System that Learns from Database Information," arXiv:2006.00888v2 [cs.DB] Feb. 22, 2021, https://digitalcollection.zhaw.ch/bitstream/11475/22000/3/2021_Brunner-Stockinger_ValueNet_ICDE-Paper.pdf, 12 pages.

(Continued)

*Primary Examiner* — Pavan Mamillapalli
(74) *Attorney, Agent, or Firm* — David Spalding (57) ABSTRACT

A computer-implemented method, a computer system and a computer program product create rules for a rule-based natural language interface for databases (NLIDB). The method may include receiving a natural language query from a user. The method may also include generating a first explanation for the natural language query using a deep learning model and a second explanation for the natural language query using the rule-based NLIDB and validating whether the first and second explanations correctly represent the natural language query. The method may further include identifying the database value in the first explanation in response to the first explanation correctly representing the natural language query and the second explanation not correctly representing the natural language query. Lastly, the method may include creating a rule in a table for the rule-based natural language interface for databases that associates the database value with the original word of the natural language query.

20 Claims, 4 Drawing Sheets

(51) Int. Cl.
   *G06F 16/2455* (2019.01)
   *G06F 40/40* (2020.01)
   *G06F 40/226* (2020.01)
   *G06F 40/279* (2020.01)
   *G06F 40/30* (2020.01)

(58) Field of Classification Search
   USPC .......................................................... 707/769
   See application file for complete search history.

(56) References Cited

U.S. PATENT DOCUMENTS

| | | | |
|---|---|---|---|
| 2012/0233207 A1* | 9/2012 | Mohajer | G06F 16/3334 |
| | | | 707/769 |
| 2018/0336198 A1* | 11/2018 | Zhong | G06N 3/08 |
| 2020/0301925 A1 | 9/2020 | Zhong | |
| 2021/0191936 A1 | 6/2021 | Khorasani | |
| 2021/0191938 A1 | 6/2021 | Galitsky | |

OTHER PUBLICATIONS

Disclosed Anonymously, "Automatic Transformation of Unstructured and Semi-structured Document Tables to Structured Relational Database Format," IP.com, IP.com No. IPCOM000245463D, IP.com Publication Date: Mar. 11, 2016, 8 pages.

Disclosed Anonymously, "Graph-based Method and System for Querying and Analyzing Enterprise Data Warehouses via Natural Language Interface," IP.com, IP.com No. IPCOM000227668D, IP.com Publication Date: May 10, 2013, 10 pages.

Disclosed Anonymously, "System and method for managing external resources as relational database tables," IP.com, IP.com No. IPCOM000198658D, IP.com Publication Date: Aug. 11, 2010, 5 pages.

Giordani et al., "Translating Questions to SQL Queries with Generative Parsers Discriminatively Reranked," Proceedings of COLING 2012: Posters, COLING 2012, Mumbai, Dec. 2012, pp. 401-410.

Mell et al., "The NIST Definition of Cloud Computing", National Institute of Standards and Technology, Special Publication 800-145, Sep. 2011, pp. 1-7.

Montgomery et al., "Towards a Natural Language Query Processing System," IEEE, 2020 1st International Conference on Big Data Analytics and Practices (IBDAP), Sep. 25-26, 2020, 8 pages.

Palakurthi et al., "Classification of Attributes in a Natural Language Query into Different SQL Clauses," Proceedings of Recent Advances in Natural Language Processing, Hissar, Bulgaria, Sep. 7-9, 2015, https://aclanthology.org/R15-1065.pdf, pp. 497-506.

Petasis et al., "Using Machine Learning to Maintain Rule-based Named-Entity Recognition and Classification Systems," Association for Computational Linguistics, Proceedings of the 39th Annual Meeting of the Association for Computational Linguistics, Jul. 2001, https://aclanthology.org/P01-1055, 9 pages.

Ray et al., "A Mixed approach of Deep Learning method and Rule-Based method to improve Aspect Level Sentiment Analysis," Applied Computing and Informatics, vol. 18, No. 1/2, 2022, Accepted Feb. 22, 2019, https://www.emerald.com/insight/content/doi/10.1016/j.aci.2019.02.002/full/pdf?title=a-mixed-approach-of-deep-learning-method-and-rule-based-method-to-improve-aspect-level-sentiment-analysis, pp. 163-178.

Villena-Roman et al., "Hybrid Approach Combining Machine Learning and a Rule-Based Expert System for Text Categorization," Proceedings of the Twenty-Fourth International Florida Artificial Intelligence Research Society Conference, 2011, https://www.aaai.org/ocs/index.php/FLAIRS/FLAIRS11/paper/viewFile/2532/3048, pp. 323-328.

* cited by examiner

REFINING UNDERSTANDING OF NATURAL LANGUAGE DATABASE QUERIES

BACKGROUND

Embodiments relate generally to the field of supervised machine learning, and in particular to refining the training of a rule-based system for converting natural language queries into structured database queries by conducting parallel deep machine learning.

Relational database management systems may be used to store and manage structured data. Data in the relational database may be accessed based on technical knowledge and expertise in a structured query language (SQL), which may require knowledge of specific commands and syntax in order to access the data. To overcome this obstacle and improve access to stored data, a natural language interface to the database systems may be used, which may allow a user to access data by asking natural language questions and receiving answers from the database. Such a rule-based natural language interface to database system may convert a natural language expression to a structured query, which may provide for simple and fast access to the information in the database. Multiple parallel methods of supervised machine learning may refine the rules of such an interface and improve the efficiency of the conversion.

SUMMARY

An embodiment is directed to improving the understanding of a rule-based natural language interface for databases (NLIDB). The method may include receiving a natural language query from a user, where the natural language query includes an original word. The method may also include generating a first explanation for the natural language query using a deep learning model, where the first explanation includes a database value, and validating whether the first explanation represents the natural language query. The method may further include generating a second explanation for the natural language query using the rule-based natural language interface, where the second explanation includes a rule-based database value, and validating whether the second explanation represents the natural language query. In addition, the method may include identifying the database value in the first explanation in response to the first explanation correctly representing the natural language query and the second explanation not correctly representing the natural language query. Lastly, the method may include creating a rule in a table for the rule-based natural language interface that associates the database value with the original word of the natural language query.

In an embodiment, the method may include identifying a rule-based database value in the second explanation in response to the second explanation representing the natural language query and the first explanation not representing the natural language query. In this embodiment, the method may also include updating the deep learning model based on the rule-based database value in the second explanation.

In another embodiment, generating the first explanation for the natural language query may include predicting a structured database query corresponding to the natural language query using the deep learning model and generating a natural language explanation based on the structured database query using natural language processing algorithms.

In a further embodiment, generating the second explanation for the natural language query may include predicting a structured database query corresponding to the natural language query using the rule-based natural language interface and generating a natural language explanation based on the structured database query using natural language processing algorithms.

In yet another embodiment, validating whether the first explanation represents the natural language query may include displaying the first explanation to the user. In this embodiment, validating whether the first explanation represents the natural language query may also include classifying the first explanation as representing the natural language query when the user indicates that the first explanation represents the natural language query and classifying the first explanation as not representing the natural language query when the user indicates that the first explanation does not represent the natural language query.

In another embodiment, validating whether the second explanation represents the natural language query may include displaying the second explanation to the user. In this embodiment, validating whether the second explanation represents the natural language query may also include classifying the second explanation as representing the natural language query when the user indicates that the second explanation represents the natural language query and classifying the second explanation as not representing the natural language query when the user indicates that the second explanation does not represent the natural language query.

In yet another embodiment, creating a rule in the table for the rule-based natural language interface may include comparing the database value in the first explanation to the rule-based database value in the second explanation and identifying the original word in the natural language query associated with the rule-based database value. In this embodiment, creating a rule in the table for the rule-based natural language interface may further include associating the original word associated with the database value in the first explanation to the identified original word associated with the rule-based database value in the second explanation when the database value matches the rule-based database value.

In addition to a computer-implemented method, additional embodiments are directed to a system and a computer program product for improving the understanding of a rule-based natural language interface for databases (NLIDB).

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

In converting natural language queries of users to structured database queries that may be understood by computers, specifically database management system, it may be common to use a natural language interface for databases (NLIDB) based on the concept of a rule-based system, which may operate using a semantic model of the database elements that defines relationships between entities. Such a rule-based systems may rely on an ontological representation of the database, involving the classification of entities and modeling of the relationships between those entities. However, generating a database ontology may generally be a time consuming and manually intensive process. Database ontologies may utilize a set of rules to specify the type of relationship that entities have with each other. The explicit nature of the relationship between entities may be provided by experts with a deep knowledge of the underlying database structure and ontology. For example, a schema annotation file (SAF) containing rules may be created by a user having knowledge of the database structure and ontology as well as the schema annotation file structure and supported formats of the phrases and the flag statements used to create the schema annotation file.

Creating such a semantic model or ontology may be a time-consuming manual process that requires deep knowledge of the database structure and schema, as each relationship is defined in a manual manner. For large or complex systems, this approach may not be tenable. Therefore, it may be advantageous to automatically self-improve the rule-system by using a parallel deep learning model. In such a method, both the rule-based system that may drive a rule-based natural language interface for databases and a parallel deep learning model may process a natural language query provided by a user. In addition to the rule-based natural language interface for databases providing a structured database query, a natural language explanation may be created for the structured database query, in addition to a separate deep learning model providing both a separate structured database query and natural language explanation. The natural language explanations may be presented to a user for validation, where the user may indicate whether or not each model may have produced a result that represents their original natural language query. The results of such a validation process may then determine next steps where the rules of the natural language interface for databases may be refined if the user rejects the NLIDB results, yet the deep learning model produced a correct representation of the natural language query (indicating a correct structured database query). If the NLIDB results were correct but the deep learning model's results did not accurately represent the natural language query that was originally entered by the user, then the rule-based natural language interface for databases would not need any refining, but the deep learning model may need to be updated. If the models agreed and were both correct or were both incorrect, there may need to be manual intervention to refine the rules or update the deep learning model, which would be outside the scope of such a method. A method such as described herein would automatically refine the rules in a rule-based system for converting natural language queries to structured database queries and also improve the efficiency and accuracy of the NLIDB without requiring an onerous level of manual intervention.

Figure 1:
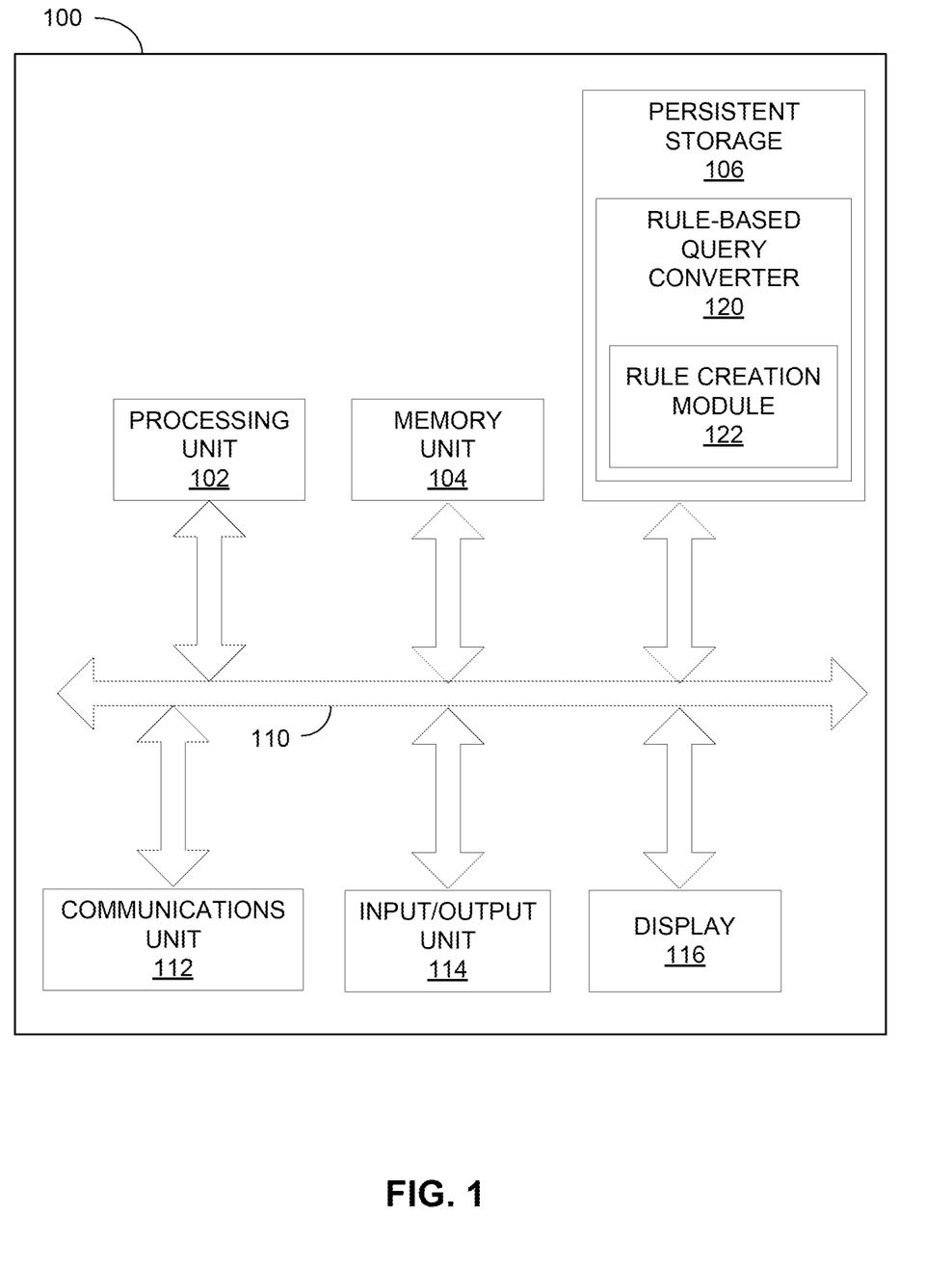
FIG. 1 depicts a block diagram of an example computer system in which various embodiments may be implemented.

Referring now to FIG. 1, there is shown a block diagram illustrating a computer system 100 in accordance with an embodiment. It should be appreciated that FIG. 1 provides only an illustration of one implementation and does not imply any limitations with regard to the environments in which different embodiments may be implemented. Many modifications to the depicted environments may be made based on design and implementation requirements. For example, computer system 100 may be implemented in hardware only, software only, or a combination of both hardware and software. Computer system 100 may have more or fewer components and modules than shown, may combine two or more of the components, or may have a different configuration or arrangement of the components. Computer system 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of computer system 100 may be co-located or distributed, or the system could run as one or more cloud computing "instances," "containers," and/or "virtual machines," as known in the art.

As shown, a computer system 100 includes a processor unit 102, a memory unit 104, a persistent storage 106, a communications unit 112, an input/output unit 114, a display 116, and a system bus 110. Computer programs such as a rule-based natural language interface for databases (NLIDB), e.g., rule-based query converter 120, and rule creation module 122 may be stored in the persistent storage 106 until they are needed for execution, at which time the programs are brought into the memory unit 104 so that they can be directly accessed by the processor unit 102. The processor unit 102 selects a part of memory unit 104 to read and/or write by using an address that the processor unit 102 gives to memory unit 104 along with a request to read and/or write. Usually, the reading and interpretation of an encoded instruction at an address causes the processor unit 102 to fetch a subsequent instruction, either at a subsequent address or some other address. The processor unit 102, memory unit 104, persistent storage 106, communications unit 112, input/output unit 114, and display 116 all interface with each other through the system bus 110.

Examples of computing systems, environments, and/or configurations that may be represented by the computer system 100 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Each computing system 100 may also include a communications unit 112 such as TCP/IP adapter cards, wireless Wi-Fi interface cards, or 3G or 4G wireless interface cards or other wired or wireless communication links. Communication between mobile devices may be accomplished via a network and respective network adapters or communication units 112. In such an instance, the communication network may be any type of network configured to provide for data or any other type of electronic communication. For example, the network may include a local area network (LAN), a wide area network (WAN), a virtual private network (VPN), a mobile or cellular telephone network, the Internet, or any other electronic communication system. The network may use a communication protocol, such as the transmission control protocol (TCP), the user datagram protocol (UDP), the internet protocol (IP), the real-time transport protocol (RTP) the Hyper Text Transport Protocol (HTTP), or a combination thereof.

The computer system 100 may be used for predicting structured database queries based on information from natural language queries entered by users that may employ machine learning. As an example, a user may enter a natural language query such as "which employees make more than $50K?". Using natural language processing algorithms, the words of the query may be understood by the rule-based query converter 120 and a structured database query may be predicted, such as "SELECT employee WHERE salary >50000". Included in this prediction may be a validation step in which the rule-based query converter 120 may form a natural language response by comparing the natural language query to internal rules. This response may then be displayed to the user for feedback as to whether the rule-based query converter 120 has understood the question, which may indicate that a correct database query has been created. The user may then indicate manually whether the rule-based query converter 120 has correctly created the database query.

In order to facilitate this conversion, the rule-based query converter 120 may consult a rules table, e.g., a schema annotation file, that contains information about the domain of which the rule-based query converter 120 is aware. Such a file may be maintained by adding new rules as the model may learn about new queries and the rule creation module 122 may assist with this task.

It should be noted here that it is not necessary for the schema annotation file to be accessed directly to add new rules. It may be useful to maintain a dictionary of words and synonyms of words to map relationships between words and phrases that may then allow for existing rules in the schema annotation file to be used more effectively. For instance, it may be learned through natural language queries that the meanings of "client" and "customer" are the same and in such a case, a dictionary entry may be added that indicates "client=customer", in which case the words may be substituted for each other when analyzing subsequent database queries. Another example may be specific names for products, where a new product name that may be entered by a user is recognized as a valid value in one of the database fields. In that case, an entry may be added to the dictionary that relates the new word to an associated database value, such that when the word is detected, it may be recognized using the existing rules of the NLIDB.

In addition, a look-up table may be created and/or maintained to capture relationships between the specific wording of a query and what is known by the rule-based query converter 120. As an example, if the NLIDB knows the question "what employee has a salary more than [NUMBER]", it may be learned that an equivalent query is "who earns more than [NUMBER]" and an entry may be created in the look-up table that equates these queries and may direct the rule-based query converter 120 to the same rule in the schema annotation file when it sees either query.

Therefore, "rule" as defined herein may include the actual rules, or semantic relations, that may be presented in the schema annotation file and may also include entries in the described dictionary or look-up table, which may be structured in a similar way to the rules as a table or a stand-alone database. As a result, the rule creation module 122 may add or edit entries in any of the files associated with the rule-based query converter 120, including the schema annotation file and any dictionaries or look-up tables that may be created or maintained in association with the rule-based query converter 120.

In addition, a separate deep learning model may be used to predict a database query from the same natural language query and the result presented to the same user for validation. If the deep learning model succeeds in predicting the database query, then this result may be used to create new rules for the rule-based query converter 120. In this way, the rules may be updated and maintained in an automated way, without intervention of a human administrator. As shown, the rule creation module 122 is loaded and running within the rule-based query converter 120 but it may be understood that the rule creation module 122 may be loaded and running separately within the persistent storage 106 of computer system 100 or may be loaded and running on a separate computing system 100 within a networked environment. It will also be appreciated by one of ordinary skill in the art that it is not required that the software is physically loaded or installed on hardware within an immediate network but may also be on any server accessible from the network, including within the cloud.

As will be discussed with reference to FIGS. 4 and 5, computing system 100 may also operate in a cloud computing service model, such as Software as a Service (SaaS), Platform as a Service (PaaS), or Infrastructure as a Service (IaaS). Any computing system 100 may also be located in a cloud computing deployment model, such as a private cloud, community cloud, public cloud, or hybrid cloud.

Figure 2:
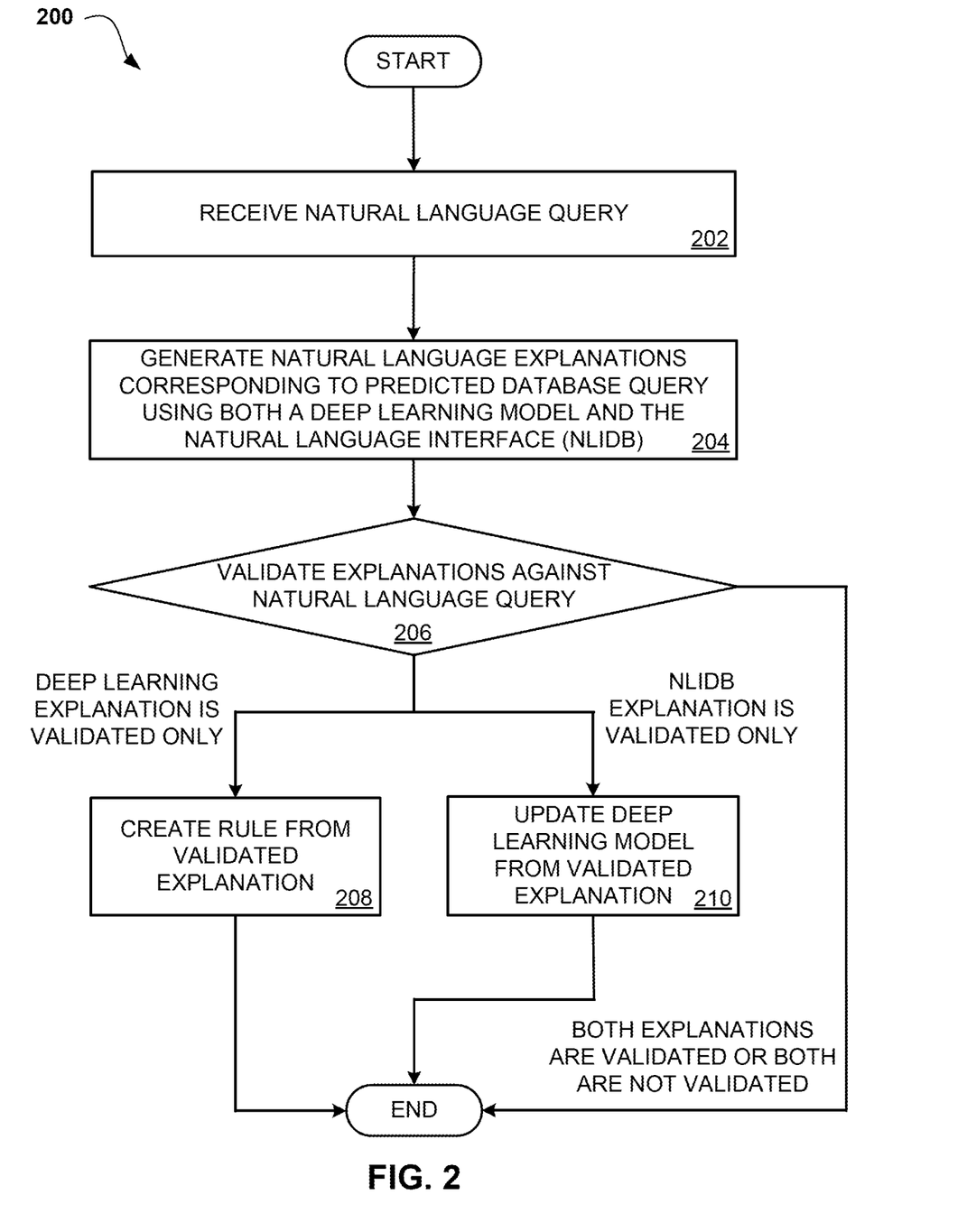
FIG. 2 depicts a flow chart diagram for a process to create rules for converting a natural language query into a structured database query using deep learning techniques according to an embodiment.

Referring to FIG. 2, an operational flowchart illustrating a process 200 for creating rules for converting a natural language query into a structured database query using deep learning techniques is depicted according to at least one embodiment. At 202, a natural language query may be received from a user. One of ordinary skill in the art may recognize that there are multiple ways for a natural language query to be entered by a user. A user may speak into a microphone embedded in a mobile device that may be carried by the user and/or a text version of the natural language query may be entered into a client application through speech to text conversion, among other methods. The user may also type directly into the client application with an appropriate input device. As an example, a user may be walking on the street and holding a mobile device, in which case the microphone may be embedded in the mobile device and the client application may also be loaded and running on the mobile device. However, it may also be understood that it is not required for the microphone to be embedded in the mobile device, only that the user may be heard such that a spoken query may be processed by a speech to text conversion algorithm. In other embodiments, the mobile device and microphone may be separate devices or may be functions that are combined into a single device or multiple devices.

A natural language processing (NLP) algorithm may be employed at this step so that the rule-based query converter 120 may understand the meaning of the words that may be entered by the user and a word embedding may be defined for each of the words. One of ordinary skill in the art may recognize that in natural language processing algorithms, word embedding is a term used for the representation of words for text analysis, typically in the form of a real-valued vector that encodes the meaning of the word such that the words that are closer in the vector space are expected to be similar in meaning. Word embeddings may be obtained using a set of language modeling and feature learning techniques where words or phrases from the vocabulary are mapped to vectors of real numbers. Conceptually this method may involve the mathematical embedding from space with many dimensions per word to a continuous vector space with a much lower dimension. Some examples of methods to generate this mapping may include neural networks, dimensionality reduction on the word co-occurrence matrix, probabilistic models, explainable knowledge base method, and explicit representation in terms of the context in which words appear.

At 204, natural language explanations, as representations of predicted structured database queries, may be generated from the natural language query using multiple separate machine learning models. Each of the models in 204 may formulate a natural language response to the user based on the natural language query in addition to a predicted structured database query. For example, if the user entered the query "How many customers bought smartphones in the first quarter of 2011?", either model may output a structured SQL query such as "SELECT clients WHERE quarter='1' AND settlementdaterange='2011 Jan. 1' and '2012 Jan. 1'". Alternatively, or in addition, either model may also output a natural language response, e.g., "You are asking about the number of clients that placed orders on a date between 2011 Jan. 1 and 2012 Jan. 1".

The rule-based query converter 120 that may be improved by the process 200 may be a rule-based system, while the model used by the rule creation module 122 may be a deep learning model. Rule-based system technology may help develop knowledge-based systems and applications, that is, intelligent programs and software capable of providing specialized problem-solving expertise in a specific subject by utilizing domain-specific knowledge. In rule-based systems, knowledge may be encoded in the form of facts, goals, and rules and used to evaluate and manipulate data. A rule-based system may use rules to perform a variety of tasks like solving a problem, interpretation, or to determine a course of action in a particular situation. Rule-based systems may be applied to systems involving human-crafted or curated rule nodes and may be used to perform lexical analysis to compile or interpret computer programs, or in natural language processing. Rule-based systems may also be categorized into forward chaining, which is a data-driven technique that may follow a deductive approach to reach a conclusion, as well as backward chaining, which is a goal-driven technique that follows an inductive approach or associative reasoning.

By contrast, deep learning is essentially a neural network with three or more layers and drives many artificial intelligence (AI) applications and services that improve automation, performing analytical and physical tasks without human intervention. Deep learning technology lies behind everyday products and services (such as digital assistants, voice-enabled TV remotes, and credit card fraud detection) as well as emerging technologies (such as self-driving cars). Deep learning neural networks, or artificial neural networks, attempts to mimic the human brain through a combination of data inputs, weights, and bias. These elements work together to accurately recognize, classify, and describe objects within the data.

Deep neural networks may consist of multiple layers of interconnected nodes, each building upon the previous layer to refine and optimize the prediction or categorization. This progression of computations through the network is called forward propagation. The input and output layers of a deep neural network are called visible layers. The input layer is where the deep learning model ingests the data for processing, and the output layer is where the final prediction or classification is made.

Another process called backpropagation may use algorithms, like gradient descent, to calculate errors in predictions and then adjust the weights and biases of the function by moving backwards through the layers in an effort to train the model. Together, forward propagation and backpropagation may allow a neural network to make predictions and correct for any errors accordingly and over time, the algorithm may become gradually more accurate.

Examples of deep learning models may include Convolutional neural networks (CNNs), used primarily in computer vision and image classification applications, which may detect features and patterns within an image, enabling tasks like object detection or recognition, and Recurrent neural network (RNNs), typically used in natural language and speech recognition applications because it may leverage sequential or times series data.

At 206, the results from both of the models in 204 may be validated by a human user and the results of the validation may then determine the next step of the process 200. Each model may display the natural language explanation to the user and allow the user to accept or reject the explanation based on whether the natural language explanation correctly represents the original natural language query entered in 202. The user may consider the responses that are received and indicate whether the response correctly represents the query that was entered, that is to say, whether the model correctly predicted the query of the user.

It is not required that the user is aware of the model that may be used to generate the predicted response or query. It is only required that a validation is performed that may accept or reject the results of the models and the subsequent steps of process 200 may be determined by the validation decisions received from the user. If the models have the same decision, meaning that if the user accepts the result from both models or rejects the result from both models, the process 200 would end and no further action may be taken. In this case, if both results are accepted by the user, then the rule-based query converter 120 may have the proper rules and require no further refinement. If both results are rejected, then the rule-based query converter 120 may need further training but since the deep learning model has been rejected as well, that model has no additional information that may be used to create a new rule. Therefore, in either of these instances, the process may end with no action having been taken with respect to the rules of the natural language interface for databases.

At 208, the natural language explanation generated from the deep learning model has been validated but the explanation from the rule-based query converter 120 has been rejected. In this instance, rules may be created for the rule-based query converter 120 that reflect the result. One type of rule that may be created is to determine a database value and corresponding word in the original natural language query and add an entry into a dictionary for the natural language interface for databases such that the NLIDB is then aware of the word.

Another type of rule that may be created may be comparing the original natural language query to the natural language explanation. For example, the natural language interface for databases may know the concept "sales role" but the original query is "what is my sales plan?" The validated natural language explanation may be "You are asking about the sales role of seller with employee ID abc." In this case, "sales plan" may now be recognized as a synonym of "sales role" and added to the dictionary of the NLIDB automatically.

An alternative rule type may be learning new question patterns for answering unknown queries. In this case, a look-up table may be used to store a new pattern from a validated natural language explanation and map the pattern to a query that may already be known by the natural language interface for databases. For example, the NLIDB may know the query "What employee has a salary equal to $50K?" The generated natural language explanation in this instance may be "You are asking about employees with salary equal to $50K." At the same time, the deep learning model may be able to answer a natural language query "Who earns $60K?", where the generated natural language explanation may be "You are asking about employees with salary equal to $60K." Look-up table entries may be created in this case that map "Who earns NUMBER" to "employee has salary equal to NUMBER" and "Who makes NUMBER" to "employee has salary more than NUMBER". The actions that may be taken in this instance are that the values in the unrecognized query may be added to the dictionary, as discussed above, and replaced by semantic types as place holders (e.g. date/time/currency/money/PERSON), for instance "Who earns $60K" may become "EMPLOYEE earns SALARY", then both the natural language query and the VALUES may be parsed shallowly (e.g., Semantic Role Labelling) to obtain a predicate-argument structure. This means "Who earns $60K" may become "earns(employee, salary)" or "Employee has salary equals to NUMBER" becomes "has(employee, salary)". The predicate-argument structure of the unrecognized question may be compared to the predicate-argument structure of every VALUE in the look-up table to find the most similar candidate and the most similar matching VALUE in look-up table may processed by the NLIDB for validation by the user. If validated by the user, a new entry of "Who earns NUMBER" mapped to "employee has salary equal to NUMBER" may be added to the look-up table.

In any of the cases above, rules may be added to new look-up tables or dictionaries that may be created for the natural language interface for databases or, in the case of existing files, any of the rules may be created and added to existing files. Also, the dictionary and/or look-up table may be intermediate steps that are not directly added to the schema annotation file (SAF) of the natural language interface for databases, which may contain the direct rules of the NLIDB. For efficiency of resources, it may not be desirable to add rules directly to this file, although the process 200 may have access to the SAF and automatically create new SAF relationships for unrecognized natural language queries. It should also be noted that in order for new rules to be directly added to the SAF, there would be a need for existing relationships to be present in the file and separate look-up tables and dictionaries may facilitate the ability to create new rules for the NLIDB.

At 210, the natural language explanation generated from the rule-based query converter 120 has been validated but the explanation from the deep learning model has been rejected. In this instance, the deep learning model may be updated in accordance with this result. The validated natural language explanation may be parsed, and database values determined for each of the words in the explanation, as explained above. From these values and words, labeled training data may be produced for the deep learning model and this feedback may be used for improving the deep learning model for future natural language queries.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 3:
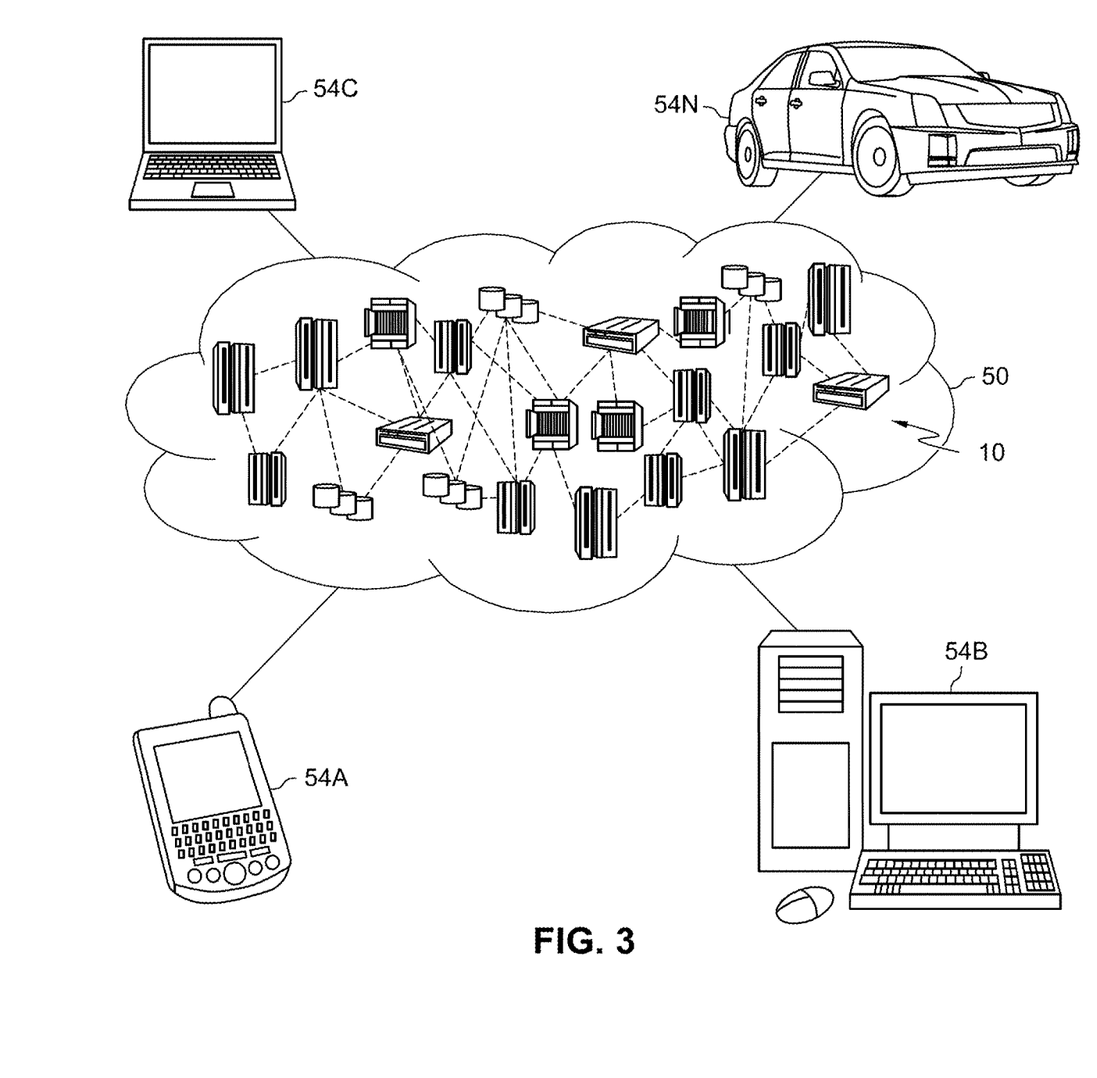
FIG. 3 depicts a cloud computing environment according to an embodiment.

Referring now to FIG. 3, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 3 are intended to be illustrative only and that computing nodes 10 and cloud computing environment 50 can communicate with any type of computerized device over any type of network and/or network addressable connection (e.g., using a web browser).

Figure 4:
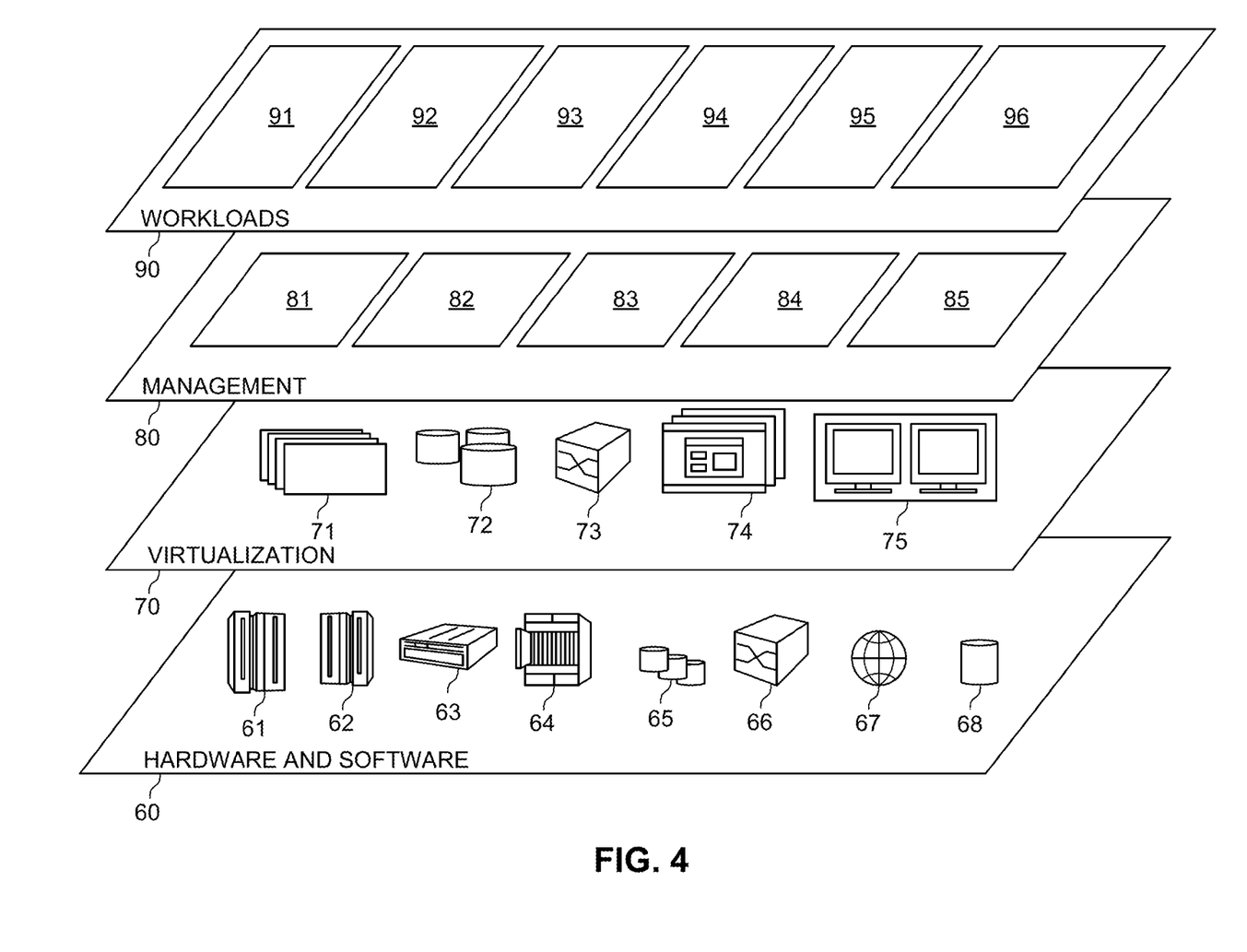
FIG. 4 depicts abstraction model layers according to an embodiment.

Referring now to FIG. 4, a set of functional abstraction layers provided by cloud computing environment 50 (FIG. 3) is shown. It should be understood in advance that the components, layers, and functions shown in FIG. 4 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66, such as a load balancer. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include mapping and navigation 91; software development and lifecycle management 92; virtual classroom education delivery 93; data analytics processing 94; transaction processing 95; and rule creation 96. Rule creation 96 may refer to refining a rule-based system for converting natural language queries of users to structured database queries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for creating rules for a rule-based natural language interface for databases (NLIDB), the method comprising:
　　receiving a natural language query from a user, wherein the natural language query includes an original word;
　　generating a first explanation for the natural language query using a deep learning model, wherein the first explanation includes a database value, and displaying the first explanation to the user;
　　generating a second explanation for the natural language query using the rule-based natural language interface, wherein the second explanation includes a rule-based database value, and displaying the second explanation to the user;
　　receiving a first decision and a second decision from the user, wherein the first decision indicates whether the first explanation represents the natural language query and the second decision indicates whether the second explanation represents the natural language query;
　　in response to the first decision from the user indicating that the first explanation represents the natural language query and the second decision from the user indicating that the second explanation does not represent the natural language query, identifying the database value in the first explanation; and
　　creating a rule in a table for the rule-based natural language interface that associates the database value with the original word of the natural language query.

2. The computer-implemented method of claim 1, further comprising:
　　in response to the second decision from the user indicating that the second explanation represents the natural language query and the first decision from the user indicating that the first explanation does not represent the natural language query, identifying the rule-based database value in the second explanation; and updating the deep learning model based on the rule-based database value in the second explanation.

3. The computer-implemented method of claim 2, wherein the creating a rule in the table for the rule-based natural language interface further comprises:
comparing the database value in the first explanation to the rule-based database value in the second explanation;
identifying the original word in the natural language query associated with the rule-based database value; and
associating the original word associated with the database value in the first explanation to the identified original word associated with the rule-based database value in the second explanation when the database value matches the rule-based database value.

4. The computer-implemented method of claim 1, wherein the generating the first explanation for the natural language query further comprises:
predicting a structured database query corresponding to the natural language query using the deep learning model; and
generating a natural language explanation based on the structured database query using natural language processing algorithms.

5. The computer-implemented method of claim 1, wherein the generating the second explanation for the natural language query further comprises:
predicting a structured database query corresponding to the natural language query using the rule-based natural language interface; and
generating a natural language explanation based on the structured database query using natural language processing algorithms.

6. The computer-implemented method of claim 1, further comprising:
classifying the first explanation as representing the natural language query in response to the first decision from the user indicating that the first explanation represents the natural language query; and
classifying the first explanation as not representing the natural language query in response to the first decision from the user indicating that the first explanation does not represent the natural language query.

7. The computer-implemented method of claim 1, further comprising:
classifying the second explanation as representing the natural language query in response to the second decision from the user indicating that the second explanation represents the natural language query; and
classifying the second explanation as not representing the natural language query in response to the second decision from the user indicating that the second explanation does not represent the natural language query.

8. A computer system for creating rules for a rule-based natural language interface for databases (NLIDB), the computer system comprising:
one or more processors, one or more computer-readable memories, one or more computer-readable storage media, and program instructions stored on at least one of the one or more computer-readable storage media for execution by at least one of the one or more processors via at least one of the one or more computer-readable memories, wherein the computer system is capable of performing a method comprising:
receiving a natural language query from a user, wherein the natural language query includes an original word;
generating a first explanation for the natural language query using a deep learning model, wherein the first explanation includes a database value, and displaying the first explanation to the user;
generating a second explanation for the natural language query using the rule-based natural language interface, wherein the second explanation includes a rule-based database value, and displaying the second explanation to the user;
receiving a first decision and a second decision from the user, wherein the first decision indicates whether the first explanation represents the natural language query and the second decision indicates whether the second explanation represents the natural language query;
in response to the first decision from the user indicating that the first explanation represents the natural language query and the second decision from the user indicating that the second explanation does not represent the natural language query, identifying the database value in the first explanation; and
creating a rule in a table for the rule-based natural language interface that associates the database value with the original word of the natural language query.

9. The computer system of claim 8, further comprising:
in response to the second decision from the user indicating that the second explanation represents the natural language query and the first decision from the user indicating that the first explanation does not represent the natural language query, identifying the rule-based database value in the second explanation; and
updating the deep learning model based on the rule-based database value in the second explanation.

10. The computer system of claim 9, wherein the creating a rule in the table for the rule-based natural language interface further comprises:
comparing the database value in the first explanation to the rule-based database value in the second explanation;
identifying the original word in the natural language query associated with the rule-based database value; and
associating the original word associated with the database value in the first explanation to the identified original word associated with the rule-based database value in the second explanation when the database value matches the rule-based database value.

11. The computer system of claim 8, wherein the generating the first explanation for the natural language query further comprises:
predicting a structured database query corresponding to the natural language query using the deep learning model; and
generating a natural language explanation based on the structured database query using natural language processing algorithms.

12. The computer system of claim 8, wherein the generating the second explanation for the natural language query further comprises:
predicting a structured database query corresponding to the natural language query using the rule-based natural language interface; and
generating a natural language explanation based on the structured database query using natural language processing algorithms.

13. The computer system of claim 8, further comprising:

classifying the first explanation as representing the natural language query in response to the first decision from the user indicating that the first explanation represents the natural language query; and classifying the first explanation as not representing the natural language query in response to the first decision from the user indicating that the first explanation does not represent the natural language query.

14. The computer system of claim 8, further comprising:

classifying the second explanation as representing the natural language query in response to the second decision from the user indicating that the second explanation represents the natural language query; and classifying the second explanation as not representing the natural language query in response to the second decision from the user indicating that the second explanation does not represent the natural language query.

15. A computer program product for creating rules for a rule-based natural language interface for databases, the computer program product comprising:

a computer readable storage medium having program instructions embodied therewith, the program instructions executable by a processor to cause the processor to perform a method comprising:

receiving a natural language query from a user, wherein the natural language query includes an original word;

generating a first explanation for the natural language query using a deep learning model, wherein the first explanation includes a database value, and displaying the first explanation to the user;

generating a second explanation for the natural language query using the rule-based natural language interface, wherein the second explanation includes a rule-based database value, and displaying the second explanation to the user;

receiving a first decision and a second decision from the user, wherein the first decision indicates whether the first explanation represents the natural language query and the second decision indicates whether the second explanation represents the natural language query;

in response to the first decision from the user indicating that the first explanation represents the natural language query and the second decision from the user indicating that the second explanation does not represent the natural language query, identifying the database value in the first explanation; and creating a rule in a table for the rule-based natural language interface that associates the database value with the original word of the natural language query.

16. The computer program product of claim 15, further comprising:

in response to the second decision from the user indicating that the second explanation represents the natural language query and the first decision from the user indicating that the first explanation does not represent the natural language query, identifying the rule-based database value in the second explanation; and updating the deep learning model based on the rule-based database value in the second explanation.

17. The computer program product of claim 16, wherein the creating a rule in the table for the rule-based natural language interface further comprises:

comparing the database value in the first explanation to the rule-based database value in the second explanation;

identifying the original word in the natural language query associated with the rule-based database value; and associating the original word associated with the database value in the first explanation to the identified original word associated with the rule-based database value in the second explanation when the database value matches the rule-based database value.

18. The computer program product of claim 15, wherein the generating the first explanation for the natural language query further comprises:

predicting a structured database query corresponding to the natural language query using the deep learning model; and generating a natural language explanation based on the structured database query using natural language processing algorithms.

19. The computer program product of claim 15, further comprising:

classifying the first explanation as representing the natural language query in response to the first decision from the user indicating that the first explanation represents the natural language query; and classifying the first explanation as not representing the natural language query in response to the first decision from the user indicating that the first explanation does not represent the natural language query.

20. The computer program product of claim 15, further comprising:

classifying the second explanation as representing the natural language query in response to the second decision from the user indicating that the second explanation represents the natural language query; and classifying the second explanation as not representing the natural language query in response to the second decision from the user indicating that the second explanation does not represent the natural language query.

* * * * *